United States Patent [19]
Di Giulio

[11] Patent Number: 5,348,098
[45] Date of Patent: Sep. 20, 1994

[54] SHOCK-ABSORBING HORSE-SHOE WITH THREE LAYERS

[76] Inventor: Benedetto Di Giulio, via F. Stilicone 10, Rome 00175, Italy

[21] Appl. No.: 916,987
[22] PCT Filed: Jul. 1, 1991
[86] PCT No.: PCT/IT91/00054
    § 371 Date: Aug. 18, 1992
    § 102(e) Date: Aug. 18, 1992
[87] PCT Pub. No.: WO92/17059
    PCT Pub. Date: Oct. 15, 1992

[30] Foreign Application Priority Data

Apr. 5, 1991 [IT] Italy .................. 91/A 000223

[51] Int. Cl.$^5$ .................. A01L 1/04; A01L 5/00
[52] U.S. Cl. .................. 168/12
[58] Field of Search .................. 168/12

[56] References Cited

U.S. PATENT DOCUMENTS

| | | | |
|---|---|---|---|
| 626,091 | 5/1899 | Peter et al. | 168/12 |
| 822,949 | 6/1906 | Hubbard | 168/12 |
| 1,043,856 | 11/1912 | Malo | 168/11 |
| 2,103,718 | 12/1937 | Goodwin | 168/12 |
| 3,023,812 | 3/1962 | Swartz | 168/23 |
| 4,513,824 | 4/1985 | Ford | 168/4 |
| 4,605,071 | 8/1986 | McKibben | 168/12 |
| 5,004,052 | 4/1991 | Appleton | 168/4 |

FOREIGN PATENT DOCUMENTS 2459615 1/1981 France .
2566234 12/1985 France .

*Primary Examiner*—Robert P. Swiatek
*Attorney, Agent, or Firm*—Beveridge, DeGrandi, Weilacher & Young

[57] ABSTRACT

A horse-shoe having two aluminum layers and between them, an internal layer made out of an elastic, shock-absorbing material such as silicone rubber. The lower or ground contact layer has a recessed groove and nail holes provided along the interior surface of bottom surface of the lower layer. The upper layer or hoof contacting layer has nail holes formed in it which are aligned with the nail holes of the lower layer such that the horseshoe can be readily attached to a hoof of a horse. The upper and lower layers are also secured at locations separate from the nail holes so as to provide a pre-assembled, multi-layer horse-shoe.

20 Claims, 1 Drawing Sheet

SHOCK-ABSORBING HORSE-SHOE WITH THREE LAYERS

FIELD OF THE INVENTION

The present invention concerns a horse-shoe suitable for any application, but in particular for race horses racing on hard ground, due to its specific shock-absorbing function.

BACKGROUND OF THE INVENTION

It is well known that horse races on hard grounds are sometimes fatal for the horses' articulations, which are particularly put under stress due to the impact of the hooves provided with horse-shoes.

SUMMARY OF THE INVENTION

It is the aim of the present invention to solve this problem.

The aim set forth is reached by means of a horse-shoe according to the present invention, realized in three layers, the two external ones being of aluminum. The horse-shoe also comprises an internal layer of elastic material, preferably silicone rubber, that will provide the horse-shoe with a shock-absorbing function.

It is a main advantage of the horse-shoe according to the present invention that it is an orthopaedic horse-shoe that can be used not only to prevent, but also to correct and heal some typical affections of the horses' articulations.

BRIEF DESCRIPTION OF THE DRAWINGS

A preferred embodiment of the horse-shoe according to the present invention is shown in the enclosed drawings, in which the FIGS. 1 and 2 show two perspective views—an upper perspective view and a lower perspective view—of the shock-absorbing horse-shoe.

DETAILED DESCRIPTION OF THE INVENTION

Figure 1:
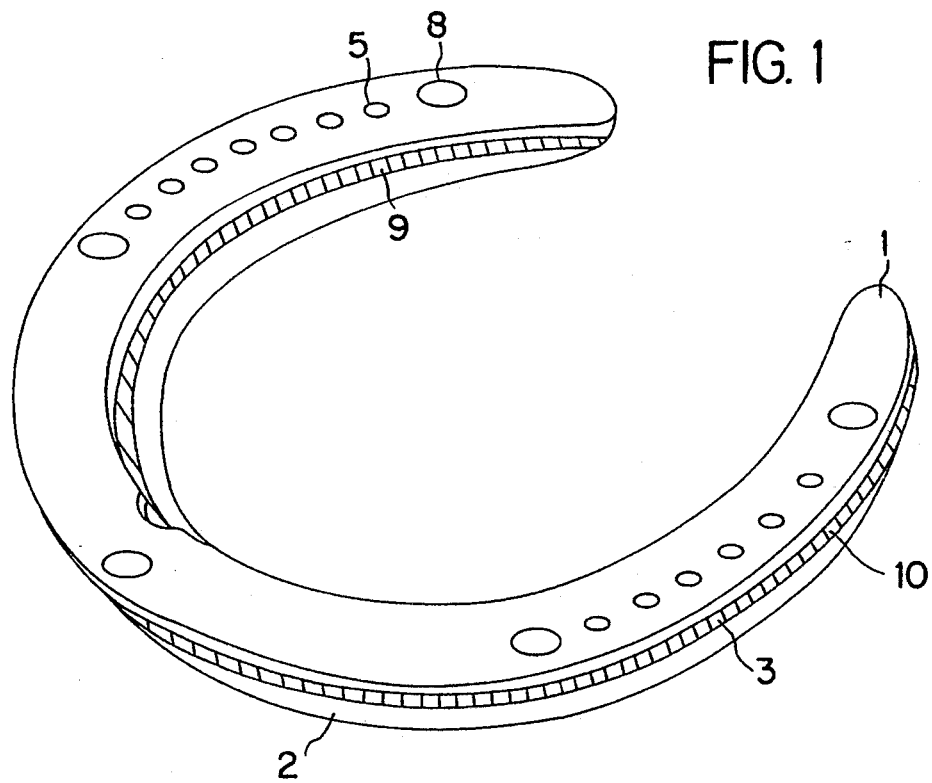

Relating to the details of the figures, the horse-shoe according to the present invention shows:
an upper aluminum layer (1) for the connection to the horse's hoof;
a lower aluminum layer (2), for contact with the ground, provided with structures (4) typical for aluminum horse-shoes;
an intermediate layer (3), fixed between said layers (1) and (2) and made out of silicone rubber so as to provide the correct elasticity to the shock-absorbing function of the complete horse-shoe.

Figure 2:
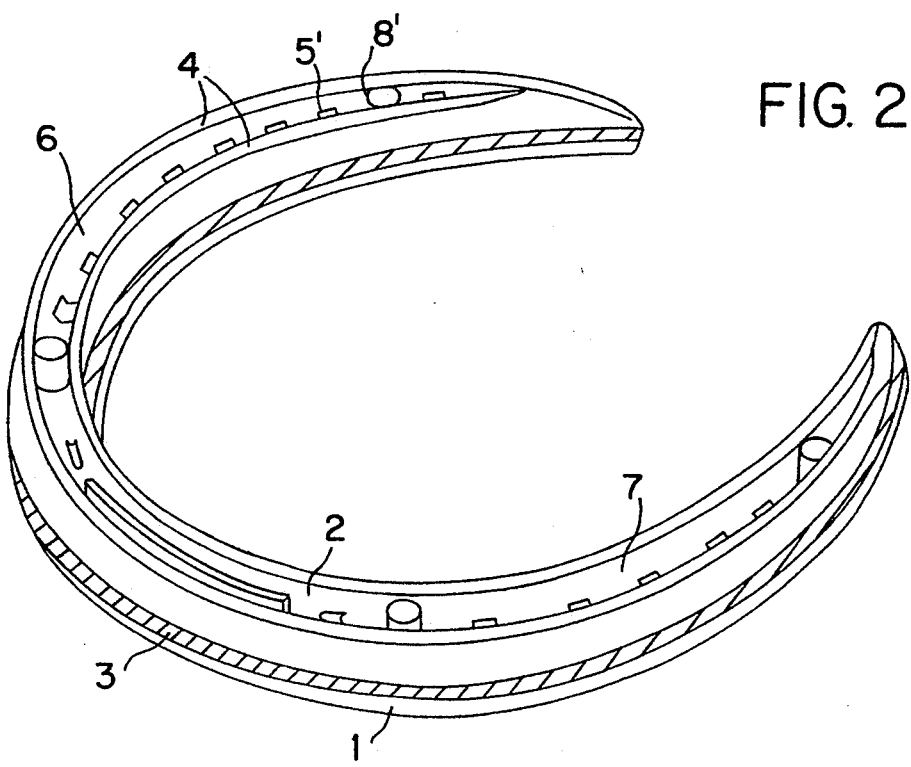

As shown in FIGS. 1 and 2, the horse-shoe includes a series of holes 5 in each side section of the aluminum layer. Holes 5 are aligned with holes 5' formed in the bottom surface 6 of the lower layer between the side edge walls which together define the lower layer's recess 7. Bottom surface 6 is shown to extend continuously across a plurality of nail holes and at a single level. Holes 5 and 5' are readily recognizable by one of ordinary skill in the art as being suitable nail holes for securing the horseshoe to the hoof of a horse. FIGS. 1 and 2 further illustrate securement means 8, 8' which join the upper and lower layers together so as to fix the elastic pad therebetwen and form a preassembled horseshoe ready for attachment in an assembled state.

Both figures also illustrate the interior side edge 9 and exterior side edge 10 of the intermediate layer 3 being commensurate with the interior and exterior side edges of the upper and lower layers. The figures also show the intermediate layer having essentially the same thickness as the upper layer, but a lesser thickness than that of the lower layer.

In possible variants provided by the present invention said internal layer (3) having a shock-absorbing function, may be realized of elastic materials different from silicone rubber but having a similar elasticity feature.

I claim:

1. A horse-shoe, comprising:
   an upper layer designed for contact with a hoof of a horse, said upper layer having nail holes;
   a lower layer adapted for ground contact, said lower layer being U-shaped and having a recessed area which is defined by side edge walls and a substantially continuous recess bottom surface extending from one end of said U-shaped lower layer to the opposite end, said recess bottom surface having nail holes formed therein, and said horse-shoe being arranged such that nail holes in said upper and lower layers are in alignment so that horse-shoe nails are adapted to pass through said upper and lower layers when said horse-shoe is being secured to a horse;
   an intermediate layer sandwiched between said upper and lower layers and formed of an elastic material so as to provide an added shock-absorbing function to the horse-shoe; and
   securement means which is separate and distinct from said intermediate layer for securing said upper and lower layers together such that said intermediate layer is sandwiched therebetween, and said securement means providing a preassembled multi-layer horse-shoe ready for securement to a hoof of a horse.

2. A horse-shoe as recited in claim 1 wherein said upper and lower layers are of aluminum.

3. A horse-shoe as recited in claim 2 wherein said elastic layer is formed of rubber.

4. A elastic as recited in claim 3 wherein said horse-shoe is formed of silicone rubber.

5. A horse-shoe as recited in claim 2 wherein said intermediate layer and upper layer are essentially of equal thickness.

6. A horse-shoe as recited in claim 5 wherein said lower layer has a thickness greater than that of said intermediate layer.

7. A horse-shoe as recited in claim 1 wherein said elastic layer is formed of silicone rubber.

8. A horse-shoe as recited in claim 1 wherein said intermediate layer and upper layer are essentially of equal thickness.

9. A horse-shoe as recited in claim 8 wherein said lower layer has a thickness greater than that of said intermediate layer.

10. A horse-shoe as recited in claim 1 wherein said upper and lower layers include a first set of aligned nail holes that are arranged in series on a first side section of said horse-shoe and a second set of aligned nail holes that are arranged in series on a second side section of said horse-shoe.

11. A horse-shoe as recited in claim 10 wherein said securement means includes multiple securement members positioned at opposite ends of each of said first and second sets of aligned nail holes.

12. A horse-shoe as recited in claim 1 wherein said securement means includes a plurality of securement members extending from said upper layer to said lower layer.

13. A horse-shoe as recited in claim 12 wherein said securement means includes multiple securement members positioned at opposite ends of first and second sets of aligned nail holes.

14. A horse-shoe as recited in claim 1 wherein said securement means secures said upper and lower layers together so as to preclude axial displacement of said layers at a time both prior to and after nailing of said horse-shoe to a hoof of a horse.

15. A horse-shoe as recited in claim 1 wherein said upper, intermediate and lower layers all have corresponding peripheral edges over an entire periphery of said horse-shoe.

16. A horse-shoe as recited in claim 1 wherein said horse-shoe includes two side portions each with a plurality of nail holes as well as an intermediate area and said bottom surface continuously extends at a common level from a first side portion, through the intermediate portion and through the opposite side portion.

17. A multi-layer horse-shoe, comprising:
  an upper layer designed for contact with a hoof of a horse, said upper layer having nail holes formed therein;
  a lower layer adapted for ground contact, said lower layer being U-shaped and having a recessed area which includes a substantially continuous recess bottom surface having nail holes formed therein and extending from one end of said U-shaped lower layer to the opposite end, and said horse-shoe being arranged so that nail holes in said upper and lower layers are in alignment such that horse-shoe nails are adapted to pass through said upper and lower layers when said horse-shoe is being secured to a horse;
  an intermediate layer sandwiched between said upper and lower layers and formed of an elastic material so as to provide an added shock-absorbing function to the horse-shoe; and
  securement means which is separate and distinct from said intermediate layer for securing said upper and lower layers together such that said intermediate layer is sandwiched therebetween and such that the layers are prevented from separating apart so that said horse-shoe is adapted for securement to a hoof of a horse while said multi-layer horse-shoe is in an assembled state.

18. A horse-shoe as recited in claim 17 wherein said upper, intermediate and lower layers all have corresponding peripheral edges over an entire periphery of said horse-shoe.

19. A horse-shoe as recited in claim 17 wherein said securement means includes a plurality of securement members extending from the upper to the lower layer.

20. A horse-shoe as recited in claim 17 wherein the bottom surface of the recess extends continuously across a plurality of nail holes and at one level across said nail holes.

* * * * *